(12) United States Patent
Moulton et al.

(10) Patent No.: US 9,466,939 B2
(45) Date of Patent: Oct. 11, 2016

(54) HIGH-GAIN OPERATION OF FIBER LASERS AT LONG WAVELENGTHS

(71) Applicant: Physical Sciences, Inc., Andover, MA (US)

(72) Inventors: Peter F. Moulton, Bedford, MA (US); Robert Stegeman, Bedford, MA (US)

(73) Assignee: Physical Sciences, Inc., Andover, MA (US)

( * ) Notice: Subject to any disclaimer, the term of this patent is extended or adjusted under 35 U.S.C. 154(b) by 0 days.

(21) Appl. No.: 14/843,302

(22) Filed: Sep. 2, 2015

(65) Prior Publication Data

US 2016/0094005 A1 Mar. 31, 2016

Related U.S. Application Data

(60) Provisional application No. 62/044,508, filed on Sep. 2, 2014.

(51) Int. Cl.
| | |
|---|---|
| *H01S 3/30* | (2006.01) |
| *H01S 3/067* | (2006.01) |
| *H01S 3/16* | (2006.01) |
| *H01S 3/23* | (2006.01) |

(52) U.S. Cl.
CPC ....... *H01S 3/06754* (2013.01); *H01S 3/06708* (2013.01); *H01S 3/1616* (2013.01); *H01S 3/23* (2013.01)

(58) Field of Classification Search
CPC ............... H01S 3/067; H01S 3/06716; H01S 3/06754; H01S 3/06725
USPC .......................................... 359/341.3, 341.1
See application file for complete search history.

(56) References Cited

U.S. PATENT DOCUMENTS

2008/0030847 A1\* 2/2008 Murison ............. H01S 3/06754
359/341.3

\* cited by examiner

*Primary Examiner* — Tuan Nguyen
(74) *Attorney, Agent, or Firm* — Proskauer Rose LLP

(57) ABSTRACT

A method of operating a Tm:doped fiber amplifier including selecting a length of Tm:doped optical fiber to be less than one hundred meters, doping the optical fiber with active ions at a doping level of greater than one percent, optically pumping the doped optical fiber with a first laser beam having a wavelength longer than the wavelength where a maximum absorption cross section is provided by the active ions, and creating a population inversion between two active ion energy levels with the first laser beam, the active ions providing a gain to a second laser beam.

19 Claims, 9 Drawing Sheets

HIGH-GAIN OPERATION OF FIBER LASERS AT LONG WAVELENGTHS

CROSS-REFERENCE TO RELATED APPLICATIONS

This application claims priority to and the benefit of, and incorporates by reference herein in its entirety, U.S. Provisional Patent Application No. 62/044,508, filed Sep. 2, 2014.

GOVERNMENT RIGHTS

This invention was made with Government support under FA9451-08-D-0199/0002 awarded by the U.S. Air Force; N00014-13-C-0077, N00024-10-C-4107, and N65538-08-M-0117 awarded by the Department of the Navy. The Government may have certain rights in the invention.

BACKGROUND OF THE INVENTION

Fiber lasers, compared to most other types of solid state lasers, are able to exhibit very high optical gains (e.g. 20-40 dB), making them useful for amplifying low-power sources such as single mode, single-frequency semiconductor lasers, and the attenuated signals found in long distance (e.g., a few kilometers) fiber-based communications systems. In addition, with the high gains they are able to operate efficiently over large fraction of their emission spectrum, on the order of the span from 50% on either side of the peak gain wavelength.

These properties are due to the ability of the fiber laser to maintain a high intensity of pump power in the core of the fiber for relatively modest (e.g., 10 mW and higher) optical pump power levels. The high intensity leads to saturation of the absorption process and a resultant high population inversion over a long length of fiber, producing a high gain. This is true even for laser transitions that have a small gain cross section (e.g., on the order of $10^{-21}$ cm$^2$), such as that of the Er$^{3+}$ ion transition in the 1550-nm wavelength region, widely used for fiber-based communications.

For wavelengths well away from that of the peak gain cross section (e.g., past the point of 50% of the peak), it is in principle possible in conventional fiber lasers to get high gain by further increasing the pump power and thereby increasing the length of fiber with a high inversion level. However, gain at or close to the peak wavelength increases as well, and eventually becomes so high that, even when extraordinary measures are taken to prevent optical feedback and the resultant unwanted lasing rather than amplification, simply the amplification of background noise in the fiber (Amplified Spontaneous Emission, or ASE) leads to a saturation of the maximum gain available. Adding pump power results in an addition to the ASE power generated by the fiber, and minimal increase in the gain. As a result, gain at the desired wavelength away from the peak can fall well below that desired. The effect of ASE or unwanted oscillation also limits the ability of a fiber laser to generate or amplify high-energy, low-duty cycle pulses at wavelengths far from those of the highest gain cross section, since ASE or oscillation can build up between pulses.

Techniques to counter the effects discussed above have included the use of special fiber core designs that create high loss for wavelengths around the gain peak, and low loss at the desired wavelength, but these designs are complicated and expensive to fabricate.

SUMMARY OF THE INVENTION

The present invention teaches systems and methods to obtain high gains (e.g., greater than 30 dB) in fiber lasers at wavelengths much longer than that of the peak of the gain cross section, through the use of a suitably chosen pump wavelength along with the use of high active-ion doping levels in the fiber. Thereby, the problem of limited gain (e.g., less than 30 dB) and low pulse-energy capability at long wavelengths in fiber lasers is solved by the disclosed technique.

In one aspect, the invention features a method of operating a Tm:doped fiber amplifier. The method involves selecting a length of Tm:doped optical fiber to be less than one hundred meters. The method also involves doping the optical fiber with active ions at a doping level of greater than one percent. The method also involves optically pumping the doped optical fiber with a first laser beam having a wavelength longer than the wavelength where a maximum absorption cross section is provided by the active ions. The method also involves creating a population inversion between two active ion energy levels with the first laser beam, the active ions providing a gain to a second laser beam.

In some embodiments, the method involves selecting a length of the Tm:doped optical fiber to be less than fifty meters. In some embodiments, the method involves doping the optical fiber with active ions at a doping level of greater than 4.5 percent. In some embodiments, the method involves doping the optical fiber with active ions at a doping level of greater than 7 percent. In some embodiments, the first laser beam has a wavelength equal to or longer than 1930 nm. In some embodiments, the second laser beam has a wavelength equal to or longer than 2000 nm.

In another aspect, the invention features a method of operating a Yb:doped fiber amplifier. The method involves selecting a length of Yb:doped optical fiber to be less than one hundred meters. The method also involves doping the optical fiber with active ions at a doping level of greater than one percent. The method also involves optically pumping the doped optical fiber with a first laser beam having a wavelength longer than the wavelength where a maximum absorption cross section is provided by the active ions. The method also involves creating a population inversion between two active ion energy levels with the first laser beam, the active ions providing a gain to a second laser beam.

In some embodiments, the method involves selecting a length of the Yb:doped optical fiber to be less than fifty meters. In some embodiments, the method involves doping the optical fiber with active ions at a doping level of greater than 4.5 percent. In some embodiments, the method involves doping the optical fiber with active ions at a doping level of greater than 7 percent. In some embodiments, the first laser beam has a wavelength equal to or longer than 1050 nm. In some embodiments, the second laser beam has a wavelength equal to or longer than 1100 nm.

In yet another aspect, the invention features method of operating a fiber laser. The method involves selecting a length of silica optical fiber to be less than one hundred meters. The method also involves doping the optical fiber with active ions at a doping level of greater than one percent. The method also involves optically pumping the doped optical fiber with a first laser beam having a wavelength such that an absorption cross section provided by the active ions is less than ten percent of a maximum absorption cross section provided by the active ions. The method also involves creating a population inversion between two active ion energy levels with the first laser beam, the active ions providing a gain to a second laser beam. The method also involves amplifying the second laser beam having a wavelength where a gain provided by the active ions is less than fifty percent of a peak gain provided by the active ions.

In some embodiments, the method involves doping the optical fiber with active ions at a doping level of greater than 4.5 percent. In some embodiments, the method involves doping the optical fiber with active ions at a doping level of greater than 7 percent. In some embodiments, the doped optical fiber is a Tm:doped optical fiber. In some embodiments, the first laser beam has a wavelength equal to or longer than 1930 nm. In some embodiments, the second laser beam has a wavelength equal to or longer than 2000 nm. In some embodiments, the method involves selecting a length of the Tm:doped optical fiber to be less than fifty meters.

As used herein, the terms "approximately," "roughly," and "substantially" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1A:
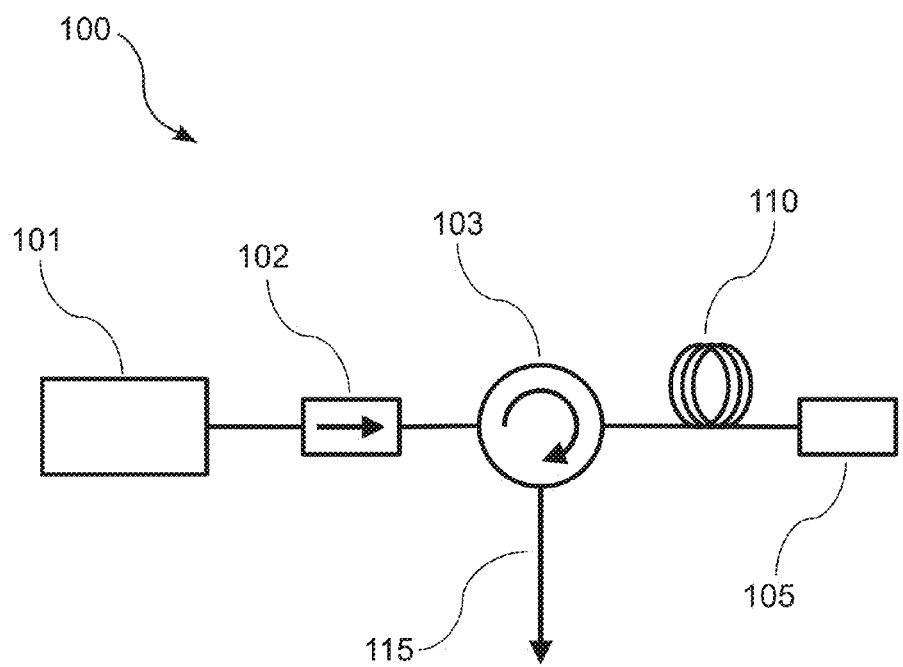
FIG. 1A is a diagram showing a fiber laser system, according to an illustrative embodiment of the invention.

Fiber lasers are a specific configuration of solid state lasers allowing the wave-guided propagation of light over very long distances in a solid medium, typically a glassy material such as silica. For fibers with the core glass doped with suitable ions, optical pumping of the ions to create a population inversion between two ion energy levels can generate amplification of light guided in the core. An optically pumped doped optical fiber can be used in fiber-based communication systems to amplify the light (signal) carrying the communication data or in other applications to amplify the output of a laser. With suitable feedback, the amplification can lead to laser action in the fiber.

The energy levels in doped fibers can be characterized by a wavelength dependent absorption cross section, indicating the strength of the transition from the lower level (ground state) to upper levels (excited states), and an associated emission cross section for the transitions from the upper levels to lower levels. Absorption and emission cross sections can be related by a temperature-dependent, detailed-balance condition such that measurement of the wavelength-dependence of either the absorption or emission cross section can be used to determine the other. The two cross sections can be determined by experimental measurements over a range of wavelengths, especially in wavelength regions where one of the cross sections is extremely small. The detailed-balance (sometimes referred to as the McCumber) relation can then be used to check the validity of the measurements. In some embodiments, absorption and emission processes that originate and terminate on the ground state of the laser-active ion, and involve emission from the lowest-energy excited state are considered. This can include fiber-laser systems based on the Yb3+, Er3+, and Tm3+ ions operating in the 1000-, 1500- and 2000-nm wavelength regions.

For the most efficient operation in terms of minimizing pump power for either a given amplification level or output power it can be desirable to pump a fiber laser where the absorption cross section is high and the emission cross section is low and to amplify or cause the system to lase where the emission cross section is high and the absorption cross section is low. However, for certain applications, it may be advantageous to operate a fiber laser at wavelengths where the emission cross section is relatively low. For example, some applications relating to Tm:silica may require amplification and/or generation of wavelengths in the 2038-nm wavelength region, where atmospheric transmission is high. Other examples relating to Tm:silica include amplification of 2050 nm light to drive Ho:YLF bulk amplifiers. The emission cross sections of Tm:silica at 2038 and 2050 nm are, only 29% and 25%, respectively, of the peak value at about 1800 nm. Other examples can include pulsed, eyesafe laser radar systems based on the Er:YAG laser at 1617 nm. The Er:YAG laser can employ Er:silica fiber preamplifiers, where the gain cross section can be as low as 11% of the peak at 1531 nm. Yet another example can be found in a Yb:silica system, where operation at 1178 nm is desired so that the output can be doubled to 589 nm and resonate with the strong absorption line of sodium atoms. Applications of the Yb:silica system are in astronomy to generate artificial guide stars in the sodium-bearing mesosphere, and in some remote sensing systems. In the case of Yb:silica being operated at 1178 nm, the emission cross section is only 2% of the peak value at about 1030 nm.

While these percentages may not seem that small, it is important to recognize that optical gain depends exponentially on the gain cross section. Thus, if a desired Tm:silica amplifier gain at 2038 nm is 1000 (30 dB), with conventional optical pumping the gain at 1800 nm would be on the order of $10^{12}$ (120 dB) and either spurious oscillation or ASE around 1800 nm would dominate the amplifier properties. Additionally, in a conventionally pumped system, even without spurious oscillation, the gain as a function of pump power saturates due to ASE and doesn't rise above 40 dB even at the peak gain wavelength, limiting gain at much longer wavelengths. In a conventionally pumped system at a wavelength of about 2038 nm, the gain may not be able to rise even to 20 dB because of the ASE. For Yb:silica at 1178 nm, to obtain fiber laser operation even with a low gain of 2 via conventional pumping, extremely large gains of about $10^{15}$ (150 dB) would occur at 1030 nm and laser action at a much shorter wavelength than the desired 1178 nm would be observed unless extraordinary losses could be established in the fiber to counterbalance the large gains at shorter wavelengths.

The invention relies on the achievement of high levels of active-ion doping in the fiber core, which has been done for entirely unrelated reasons for Tm:silica, to promote efficient cross-relaxation pumping. For Yb:silica the same techniques employed for high doping of Tm:silica can be applied. In fact, use of high Yb doping levels has been discouraged by the observed stronger tendency of heavily Yb-doped silica fibers to develop color centers ("photodarken") when optically pumped compared to fibers with lower doping levels. The photodarkening process reduces the efficiency of Yb:silica lasers by creating unwanted absorption in the pumping wavelength region. Measurements of the rate of photodarkening show that it also depends strongly on the level of population inversion created by pumping. As discussed below, the inversion levels employed in fiber designs used for operation at long wavelengths are well below those associated with photodarkening processes, and this is not expected to be an issue for the invention.

In some embodiments, a fiber laser according to the invention is based on Tm:silica and operates at a wavelength in the range of 2000-2050-nm region. In some embodiments, the fiber laser is employed in an Er:YAG-based coherent ladar source, with the fiber laser based on an Er:silica fiber operating at a long-wavelength of 1617 nm.

In some embodiments, a fiber laser is pumped at long wavelengths where the stimulated emission cross section for the laser transition is large. Pumping at long wavelengths can limit the maximum inversion density created by the pumping process, even when the pump intensity in the fiber is large enough to saturate the pumping process. Simple energy conservation considerations indicate that no significant gain is developed at wavelengths shorter than the pump light. In some embodiments, gain at shorter wavelengths is only possible by extracting heat from the fiber, a low-probability process.

In some embodiments, a fiber amplifier with gain peaked at the desired signal wavelength can be obtained by pumping a fiber laser at a wavelength somewhat shorter than the signal wavelength to be amplified. In some embodiments, the gain at wavelengths shorter than the signal wavelength can be reduced to a level where spurious oscillation or ASE is prevented.

The drawback to the long-wavelength pumping is that the absorption cross section for the pump wavelength is typically small, and thus with fibers doped at levels conventionally used for high-gain amplifiers (e.g., 0.1-1%), the length of fiber required to efficiently absorb the pump light can be very long (e.g., over 100 meters). This results in an expensive device, with possible issues in signal distortion from the long length of fiber. For Tm-doped fibers around 2000 nm, the intrinsic losses due to fundamental phonon-related absorption in the fiber can be so high that they can even exceed the gain per unit length from the laser transition.

In some embodiments, highly doped fibers (e.g., with a doping level of around 4.5-7%) are used to obviate the need for long fibers (e.g., fibers longer than 100 meters). Typically, these high dopings are not used in high-gain fiber amplifiers. The incorporation of high levels of rare earths presents a challenge to the fabrication and pulling of the glass preforms used for the most widely-used silica-based fibers. Pure silica has a limited number of sites to incorporate rare-earths as impurities, and one typically uses mixed-glasses, by incorporating aluminum ions into the melt, to allow fabrication of silica-based fibers. This in turn leads to an increase in the refractive index of the core glass, and can provide a challenge in the fabrication of single-mode fibers where the numerical aperture (NA) of the fiber core is be below a certain level to avoid multimode operation. For reasons unrelated to the invention, highly doped Tm:silica fibers have been developed, and the fabrication problems solved to the point that the fibers are commercially available. The same general approach can be applied to highly-doped Yb:silica fibers. The use of highly doped Er:silica fibers is problematic for reasons related to the fundamental energy levels of the Er ion, but "heavily doped" (e.g. 1%) Er:silica fibers are commercially available and can be employed by the present invention, having been developed, not for communications, but for high power lasers.

FIG. 1A depicts a fiber laser system 100 in accordance with an illustrative embodiment of the present invention. The fiber laser system 100 includes an optical fiber 110 doped with active ions. The active ions can have an electronic ground state and an electronic excited state. In some embodiments, the active ions can have multiple electronic excited states. In some embodiments the active ions can be Thulium, Ytterbium, or Erbium ions. The fiber can have a length along a z-axis. In some embodiments, the optical fiber can be made of silica. During operation, a pump laser beam 101 passes through an optical isolator 102 and an optical circulator 103 to enter one end of the doped optical fiber 110. A signal (seed) laser beam generated by a laser 105 enters the other end of the optical fiber 110. An amplified signal beam 115 exits the optical fiber after passing through the optical circulator 103. The interaction between the pump laser 101 and the active ions in the fiber 110 can cause the active ions to transition from an electronic ground state (i.e. lower state) to an electronic excited state (i.e. upper state), the active ions absorbing a portion of the power from the pump laser 101. In the absence of a pump laser 101, all of active ions can be in the electronic ground state. In the presence of a pump laser, a fraction of ions can be in the electronic excited state. The interaction between the signal laser 105 and the active ions can cause the active ions to transition from an electronic excited state to an electronic ground state, the active ions amplifying the signal laser beam 105. The active ions can also spontaneously transition from an electronic excited state to an electronic ground state, emitting photons in the process. A fraction of the spontaneously emitted photons can be guided by the optical fiber 110.

The guided spontaneously emitted photons can cause a portion of active ions to transition from an electronic excited state to an electronic ground state, the active ions amplifying a portion of the guided spontaneously emitted photons. The amplification of spontaneously emitted photons can be referred to as amplified spontaneous emission (ASE). ASE can be of particular concern in fiber lasers, where a large fraction of the spontaneous emission from the pumped ions is guided in the fiber core. As shown in FIG. 1A, beams from the pump laser 101 and the signal laser 105 can be counter-propagating in the active fiber 110, while in other embodiments beams from the pump laser 101 and signal laser 105 can be co-propagating (i.e. traveling in the same direction) in the active fiber 110.

As pump power is applied to the fiber, the density of ions in the upper level increases and with enough power builds up to a level comparable to the number of active ions. The absorption of pump light (ignoring the effect of spontaneous decay) stops when the absorption process saturates, or bleaches, with the condition:

$$\sigma_{ap} N_0 = \sigma_{ep} N_1$$

where $\sigma_{ap}$ is the absorption cross section in cm$^2$ at the pump wavelength, $\sigma_{ep}$ is the emission cross section in cm$^2$ at the pump wavelength, $N_0$ is the density (cm$^{-3}$) of active ions in the lower laser level as a function of position (z) along the length of the fiber, and $N_1$ is the density (cm$^{-3}$) of active ions in the lower laser level as a function of position (z) along the length of the fiber.

For higher pump powers the density of ions in the upper cannot increase any further. An inversion fraction $F_1$ can be defined by the relation:

$$F_1 = N_1 / N_t$$

where $N_t$ is the total density (cm$^{-3}$) of active ions.

Here it is assumed that there are only two levels involved, appropriate when the pump light is directly exciting the upper laser level. The value of the inversion fraction at which pump bleaching occurs $F_{1p}$ can then be given by:

$$F_{1p} = (\sigma_{ap}/\sigma_{ep})/(1+\sigma_{ap}/\sigma_{ep})$$

It is noteworthy that the interaction of the signal power with the density of ions in the upper and lower levels leads to optical gain when the condition $$\sigma_{es} N_1 > \sigma_{as} N_0$$

is satisfied, and optical loss if the value of $N_1$ is smaller than the criteria shown. In parallel to the discussion related to pump bleaching, a minimum inversion fraction to get optical gain ($F_{1s}$) can be defined by:

$$F_{1s} = (\sigma_{as}/\sigma_{es})/(1+\sigma_{as}/\sigma_{es})$$

This relation can in turn be used to determine the pump power required to get optical gain, in the fiber, rather than loss, as a function of signal wavelength. A fiber signal gain (or loss coefficient) $g_0$, in units of inverse length, can be defined by the following relation:

$$g_0 = N_t [\sigma_{es} F_{1s} - \sigma_{as}(1-F_{1s})]$$

One of the key concepts in this invention relates to means to limit the inversion fraction in the fiber to obtain gain at the desired signal wavelength without generating excessive gain at shorter wavelengths.

In the following, examples of the invention are provided for Tm- and Yb-doped silica fibers. Models are based on data developed for the Tm:silica material and on published data for Yb:silica fibers. It is understood that the specific cross section data depends on the actual glass composition in the fiber, which typically includes dopants other than the active rare earth to provide functions such as increasing the ability of the glass to incorporate high levels of the active ion. However, the invention does not depend on specific compositions of the glasses, other than using high rare-earth doping levels, and can apply to other fibers, such as those pulled from so-called "soft" glasses such as phosphate-, silicate-, or fluoride-based materials.

Figure 1B:
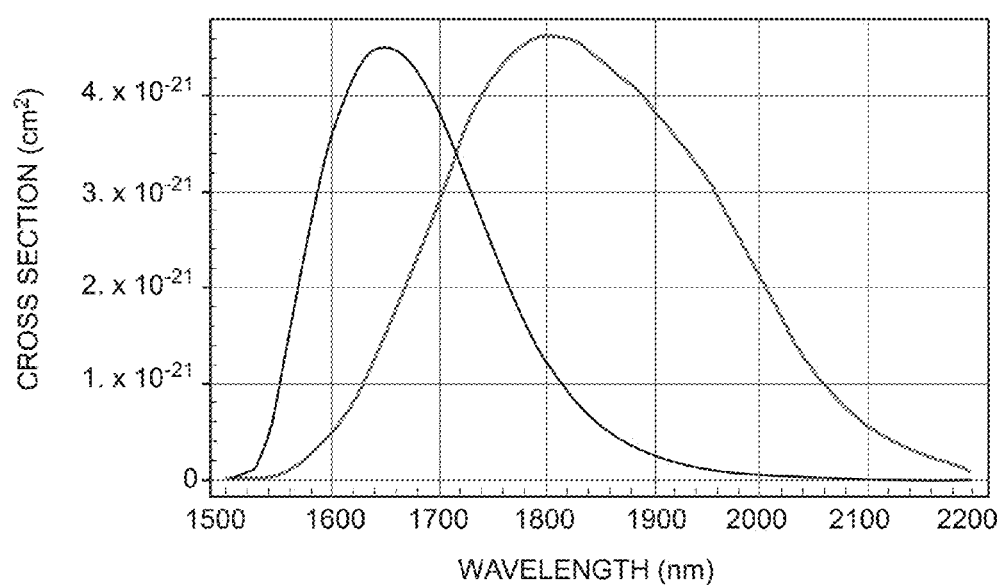
FIG. 1B is a graph showing the absorption and emission cross sections of Tm:silica as a function of wavelength, according to an illustrative embodiment of the invention.

FIG. 1B shows the absorption and emission cross sections, in cm$^2$, for Tm:silica as a function of wavelength. For example, at a wavelength of 1600 nm, the absorption cross section is about $3.5 \times 10^{-21}$ (cm$^2$) and the emission cross section is about $3 \times 10^{-22}$ (cm$^2$). The data shown in FIG. 1B forms the basis for the models regarding Tm:silica fiber amplifiers.

Figure 2:
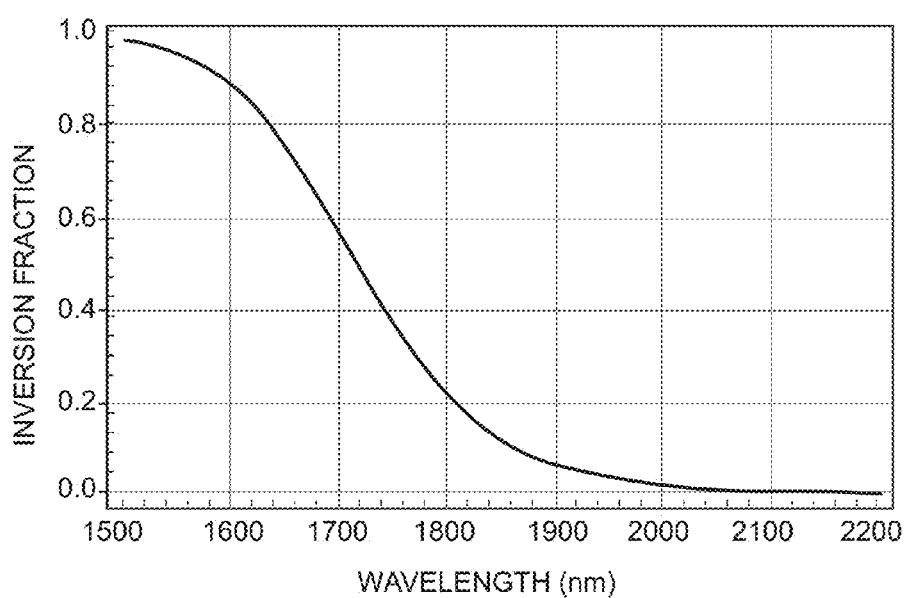
FIG. 2 is a graph of the Tm:silica gain fractions as a function of wavelength, according to an illustrative embodiment of the invention.

FIG. 2 shows the value of the inversion fraction $F_{1p}$ (and also $F_{1s}$) as a function of wavelength, based on the cross section values for Tm:silica fibers shown in FIG. 1B. As predicted by the formulas above, at wavelengths where the absorption cross section is large and the emission cross section is small, one can obtain large values for the inversion fraction, approaching unity. As the wavelength increases, the maximum inversion fraction possible with pumping falls, but so does the minimum fraction required to get optical gain. Typical high-gain fiber amplifiers are pumped at wavelengths where a large inversion fraction can be developed with a reasonably large absorption cross section. Additionally, typical high-gain fiber amplifiers are operated at signal wavelengths where the gain cross section is high. For a Tm:silica fiber amplifier, a good choice for a pump wavelength for a typical amplifier would be about 1620 nm.

Figure 3:
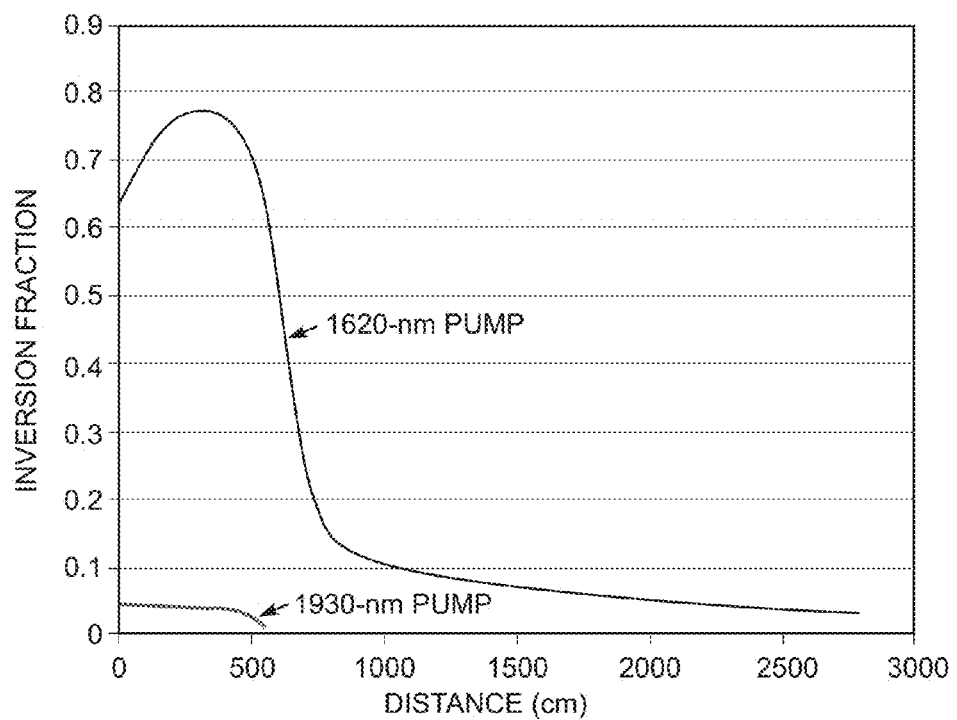
FIG. 3 is a graph of the Tm:silica inversion as a function of distance for two different wavelengths and fiber dopings, according to an illustrative embodiment of the invention.

FIG. 3 shows an inversion fraction of active ions in a Tm:silica fiber as a function of distance for both a 1620 nm pump and a 1930 nm pump. For example, at a distance of about 400 cm, a Tm:silica fiber pumped with 1620 nm pump light has an inversion fraction of about 0.75, while at the same distance of about 400 cm, a Tm:silica fiber pumped with 1930 nm pump light has an inversion fraction of about 0.05.

In one embodiment, the pump can have a wavelength of 1620 nm, the fiber can have a 5.5 µm diameter, a 0.24 NA active core, a length of 28 m, and can be doped with 0.1% Tm$_2$O$_3$ by weight. The latter doping level is common for fibers used in core-pumped Tm:fiber amplifiers, as exemplified by Nufern (East Granby, Conn.) fiber SM-TSF 9/15. The pump power can be 500 mW. FIG. 3 (1620-nm pump) shows an inversion fraction of active ions in a Tm:silica fiber as a function of distance for this embodiment. In accordance with the plot in FIG. 2, the plot in FIG. 3 shows that a high inversion fraction, 0.75, can be achieved along the fiber length, near the pump input end. Here, pump bleaching of the fiber absorption is significant, and a longer length of fiber is needed to efficiently absorb all of the pump power. The reduction in inversion at the pump input end (z=0) of the fiber is the result of a high level of ASE, much of which emerges out of the pump-input end of the fiber. The length of the fiber was selected, in this embodiment, to maximize the fiber gain at 2000 nm.

In another embodiment for a Tm:silica fiber amplifier, the pump can have a wavelength of 1930 nm, the fiber can have a 5.5 µm diameter, a 0.24 NA active core, a length of 5.5 m and can be doped with 7.3% Tm$_2$O$_3$ by weight. Such a doping level is available in commercial Tm-doped fibers, as exemplified by Nufern fiber SM-TSF 5/125. The high doping level of 7.3% can permit the use of relatively short lengths of fiber even with a small absorption cross section at the pump wavelength of 1930 nm. FIG. 3 shows the inversion fraction of active ions in a 1930-nm-pumped embodiment of the Tm:silica fiber as a function of distance along the fiber. As expected from the plot on FIG. 2, the maximum inversion with the 1930-nm pump is limited to about 0.04.

Figure 4:
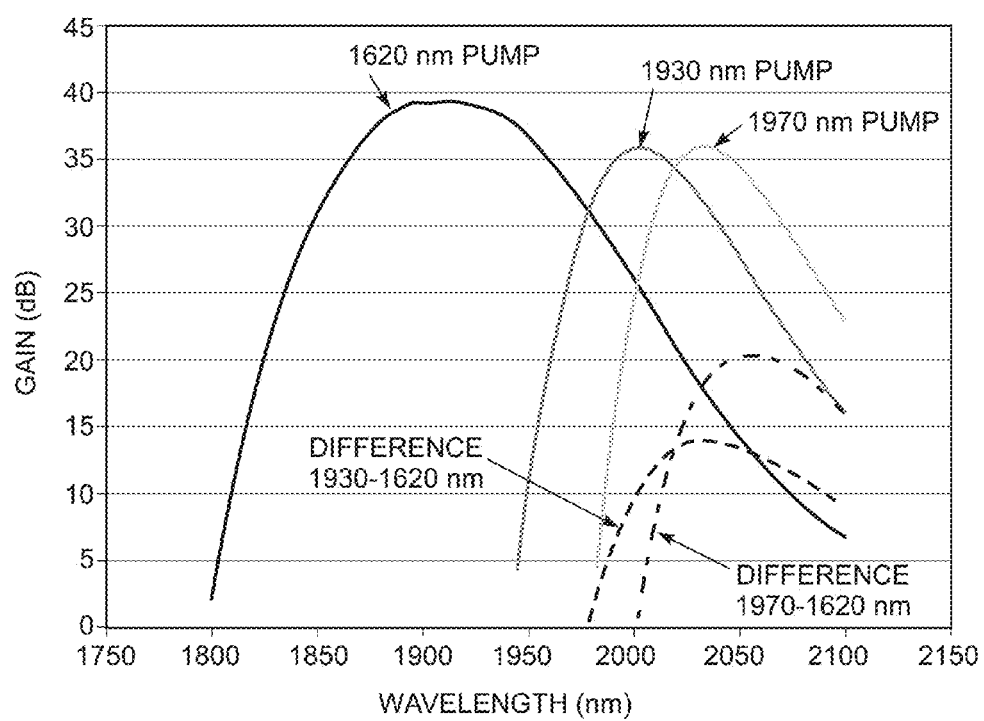
FIG. 4 is a graph of the gain in dB for a Tm:silica fiber as a function of wavelength for three different pump wavelengths, according to an illustrative embodiment of the invention.

FIG. 4 shows, for the embodiments just discussed, the fiber-amplifier gain in dB as a function of the signal wavelength for the 1620-nm and 1930-nm pump wavelength. For example, the gain peaks (nearly 40 dB) at about 1920 nm for the 1620-nm-pumped fiber, and the gain at around 2000 nm is 26 dB. The gain for the 1930-nm-pumped fiber peaks around 2000 nm at 36 dB. The difference between the gains corresponding to the 1620-m pump and the 1930-nm pump is also shown in FIG. 4. For example, at about 2025 nm, the difference in gain between the 1930-nm-pumped fiber and the 1620-nm pumped fiber is about 14 dB.

FIG. 4 also shows fiber amplifier gain in dB as a function of the signal wavelength for a 1970 nm pump wavelength. In an embodiment where the pump wavelength is 1970 nm, the parameters are similar to the embodiment having a 1930-nm-pump wavelength, except that the pump power is 780 mW, the fiber length is 14 m, and the peak gain is at 2032 nm. FIG. 4 additionally shows the difference in gain between the 1620-nm and 1970-nm-pumped fiber amplifiers, as a function of signal wavelength. In this case the gain difference is as high as about 20 dB, at a wavelength of about 2060 nm.

In the embodiments described, models for the ASE emitted by the 1620-nm-pumped laser show considerable power emitted from the fiber. Those skilled in the art will recognize that the gain of the 1620-nm-pumped fiber amplifier could be increased by increasing the pump power, and thereby making up some of the difference in gain at longer wavelengths. However, calculations show that the gain for the 1620-nm-pumped fiber cannot be increased to a significantly higher level by simply increasing the pump power, because a substantial amount of ASE power generated in the fiber increases as well, preventing a significant rise of inversion density.

Figure 5:
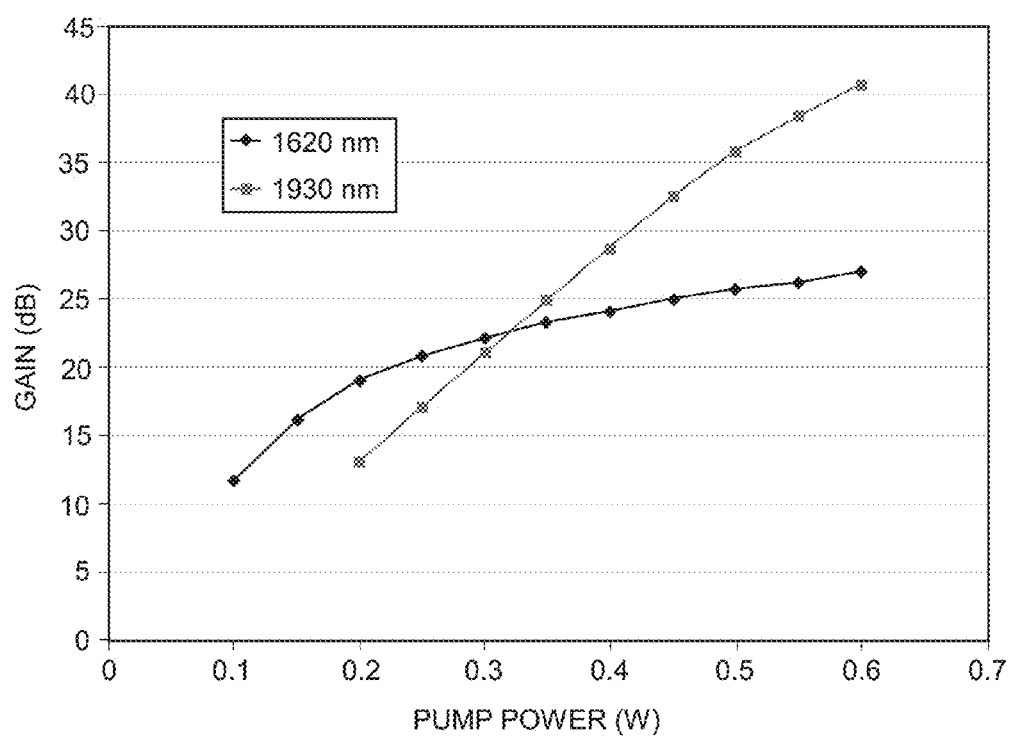
FIG. 5 is a graph of the gain in dB at 2000 nm for a Tm:silica fiber as a function of pump power for two different pump wavelengths, according to an illustrative embodiment of the invention.

To illustrate this, FIG. 5 shows the gain at 2000 nm for the embodiments having 1620-nm and 1930-nm pumping wavelengths, as a function of pump power. Additionally, FIG. 5 shows that a gain increase with pump power begins to saturate at about 150 mW for a 1620 nm pump, due to ASE, and increases to only 26 dB at the maximum pump power shown of 600 mW, while for a 1930 nm pump the gain can still be increasing, even at 600 mW of pump power, albeit with some saturation from ASE becoming evident at the highest powers.

Figure 6:
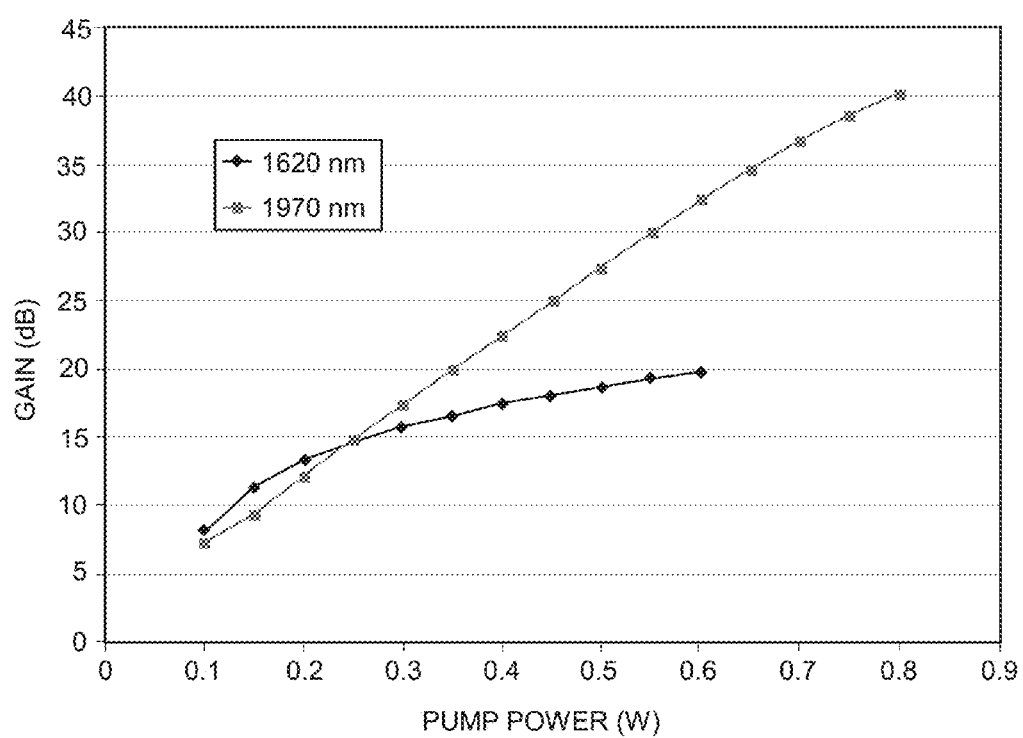
FIG. 6 is a graph of the gain in dB at 2032 nm for a Tm:silica fiber as a function of pump power for two different pump wavelengths, according to an illustrative embodiment of the invention.

To further illustrate this, FIG. 6 shows the gain at 2032 nm for the embodiments with 1620-nm and 1970-nm pumping wavelengths, as a function of pump power. Here the 1620-nm-pumped amplifier can only reach 20 dB of gain with 600 mW of pump power, and computer simulations show at this level that about half of the pump power is being emitted from the fiber ends as ASE. In contrast, gain for the 1970-nm pump wavelength is still increasing even at 800 mW of pump power and has risen to a level of 40 dB.

In terms of ASE power emerging from the fiber, comparing the 1620-nm-pumped and 1930-nm-pumped embodiments as 2000-nm amplifiers, the former, at 25 dB of gain (450 mW of pump power) generates a total ASE power of 190 mW, while the 1930-nm-pumped embodiment at the same gain (with 350 mW of pump power) produces only 1.8 mW of total ASE power. In comparing the 1620-nm-pumped and 1970-nm-pumped embodiments as 2032-nm amplifiers, the former, at 20 dB of gain (600 mW of pump power) generates a total ASE power of 3100 mW, while the 1970-nm-pumped embodiment at the same gain (with 450 mW of pump power) produces only 0.6 mW of total ASE power.

A lower doping level of 0.1%, which would be typical for a shorter-wavelength pump, such as at 1620 nm, for a 1930-nm and 1970-nm pump wavelength would lead to fiber lengths on the order of about 400 and 1000 meters, respectively, expensive and impractical for many applications. The embodiments shown for long-wavelength pump sources, with 7.3% doping, enable the use of practical fiber lengths.

It is known that the fused silica material used for the majority of fiber lasers exhibits an intrinsic absorption of light in the wavelength region covered by Tm:fiber amplifiers. This absorption is caused by the vibrational modes of the silica glass, and increases at longer wavelengths, as reported by K. Mochizuki, Y. Namihira, M. Kuwazura, and Y. Iwamoto ("Behavior of Hydrogen Molecules Adsorbed on Silica in Optical Fibers," IEEE J. Quantum Electron. 20, 694 (1984)). One can re-write the expression for fiber optical gain given above with this absorption included as:

$$g_0 = N_t[\sigma_{es}F_{1s} - \sigma_{as}(1-F_{1s})] - \alpha_s$$

where $\alpha_s$ is the absorption from the silica glass (in cm$^{-1}$).

As an example, at a wavelength of 2100 nm, the value of $\alpha_s$ is reported to be about $1.3 \times 10^{-4}$ cm$^{-1}$. In one embodiment, if a Tm:fiber amplifier is operated with a 1970-nm pump laser, it would be able to create a maximum value for $F_{1s}$ of about 0.027. From the data plotted in FIG. 1B, the value for $\sigma_{es}$ can be determined as approximately $5.8 \times 10^{-22}$ cm$^2$ at 2100 nm. As a result of these numbers, the Tm:fiber amplifier would require a fiber doped to a value of $N_t$ greater than about $8.3 \times 10^{18}$ ions/cm$^3$, corresponding to a doping level of 0.12%. Thus, the Tm:fiber amplifier would not be able to function as an amplifier at 2100 nm when pumped at 1970 nm. In practical terms, it is desirable to have the gain at least 10× higher than the loss, which can be achieved with doping levels of >1%. With the 7.3% doping level described in previous embodiments, the background loss has a negligible effect on amplifier performance. Those skilled in the art will recognize that for pump wavelengths longer than 1970 nm, or signal wavelengths longer than 2100 nm, the advantage of a high doping level becomes even more significant.

In one embodiment, the design of FIG. 1 can employ a 1970-nm pump laser (101), a Thorlabs IO-J-2000 optical isolator (102), AdValue AP-CIR-2000PI optical circulator (103), gain fiber 110 employing Nufern TDF-5-125 Tm:fiber, and a 2-mW-power, 2039-nm seed laser (105). The fiber can be 10 m in length, the pump power can be 1800 mW, and a signal laser beam can be amplified by over 24 dB at 2039 nm. The predicted gain for this embodiment was 28 dB, not accounting for any of the splice losses, or losses in the circulator, the sum of which could account for the difference between the model and the data.

Figure 7:
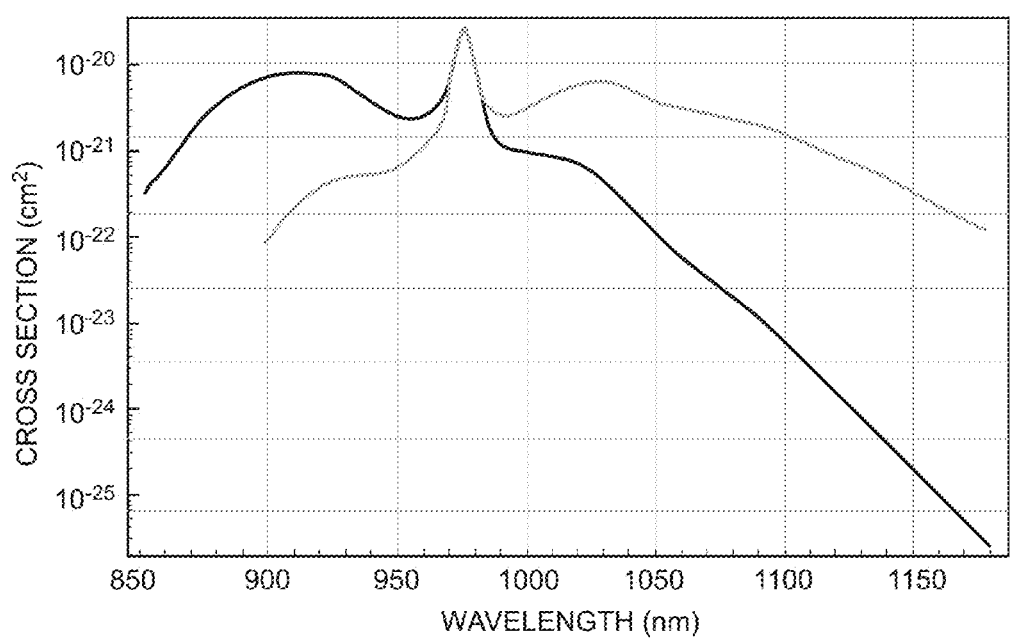
FIG. 7 is a graph of the absorption and emission cross sections for a Yb:silica fiber as a function of wavelength, according to an illustrative embodiment of the invention.

FIG. 7 shows the absorption and emission cross sections for a Yb-doped silica fiber as a function of wavelength. Gain extends out to 1200 nm, but is greatly reduced from the peak. For astronomy and other applications, there is considerable interest in obtaining a laser source in the region of 589 nm, in resonance with the strongly absorbing D lines of the sodium atom. One of the approaches to making a source at 589 nm is to frequency double the output of a Yb:silica fiber laser operating at 1178 nm. To avoid the issue of much higher gain (e.g., greater than 30 dB) at short wavelengths, past work has included the development of special, complex, photonic-crystal fiber designs that provide very high attenuation (e.g., greater than 30 dB) for fiber core signal light at shorter wavelengths than 1178 nm. The present invention allows a simpler approach, based on conventional step-index fiber designs. The gain cross section in Yb:silica at 1178 nm is very low (about 2% of the peak gain), making high-gain amplifiers impractical. The best approach may be to fabricate a fiber laser, rather than amplifier. A single-pass gain of 1.2-1.3, combined with an appropriate low-loss resonator, say, based on fiber Bragg gratings, may be a suitable design approach.

Figure 8:
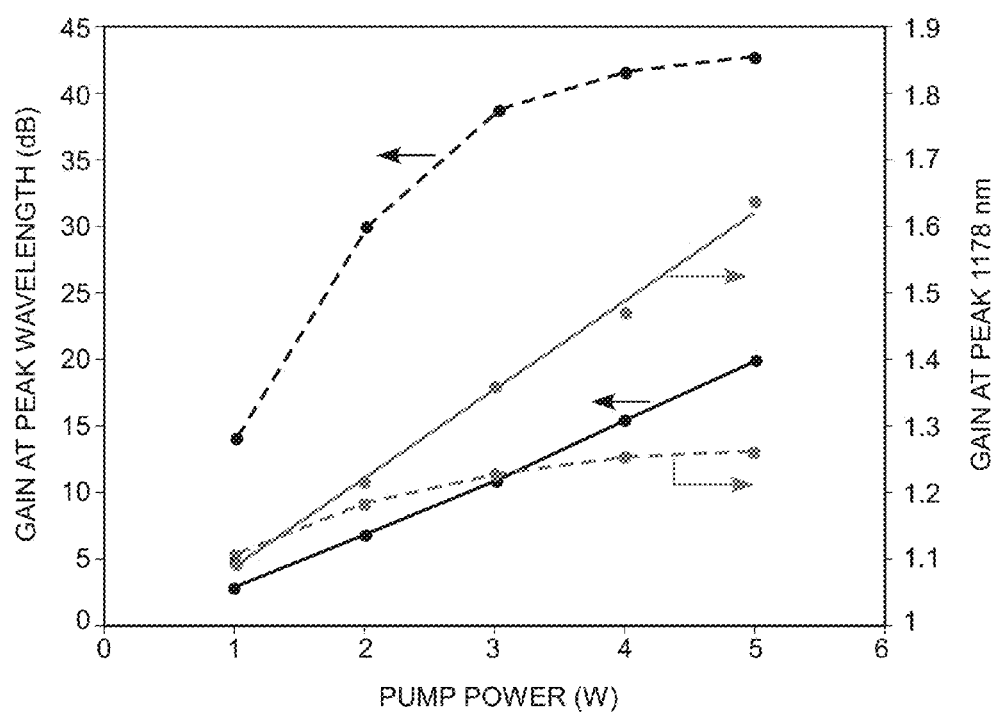
FIG. 8 is a graph of gain in dB at 1178 nm and at the peak wavelength as a function of pump power for two different pump wavelengths, according to an illustrative embodiment of the invention.

FIG. 8 shows the signal gain (on the right-hand vertical axis) at 1178 nm for two fiber-laser designs. Both designs employ core-pumped, 25-μm-radius, 0.1 NA core fibers. In some embodiments, the fiber can be doped with 1.6 wt. % $Yb_2\alpha_3$ pumped at a conventional wavelength of 977 nm. The optimal length of the fiber can be 0.4 meters at low pump powers, and 0.5 meters at the highest pump power. In some embodiments, the fiber can be doped at the 5 wt. % level, and can be pumped at 1064 nm, a wavelength readily available from either Nd:YAG or Yb:silica fiber lasers. The optimal fiber length at low powers can be 3 m, increasing to 10 m at the highest pump power.

For a conventional design, the gain reaches a maximum of 1.25 and does not increase any further as the pump-power rises. This is due the strong increase in ASE power with pump power, which effectively prevents the net gain in the fiber from rising much above a certain value. On the left-hand vertical scale the gain is plotted (in dB) at the peak of the gain for the fiber, around 1030 nm for the 977 nm pump source. Even at a modest 2 W of pump power, where the 1178-nm gain is only 1.2, the peak gain in the fiber is 30 dB (or double that for the round trip in a laser cavity) and it would be a challenge to suppress oscillation in the 1030 nm region with any laser cavity, even with highly selective reflective elements such as Bragg gratings.

For a 5 wt. % doped fiber pumped at 1064 nm, FIG. 8 shows a gain at 1178 nm linear in pump power up to 5 W, reaching a level of >1.6 at that point. The gain peak in the fiber occurs at approximately 1100 nm. FIG. 8 shows that, even with full pump power, the peak gain is only 20 dB. For the gains needed to get laser action in the fiber with a suitable output coupling loss, in the 20% range, the gain at the peak would fall below 10 dB. Suppression of unwanted laser action can be achieved with appropriately selective cavity elements. In some embodiments, once the threshold condition is reached, the inversion density is fixed at the threshold value for higher pump powers and 1178 nm power is efficiently generated without generation of significant power at shorter wavelengths.

Other uses of long-wavelength Yb:silica fiber lasers may involve shorter wavelength generation, for applications such as visible light generation in the 550-580 nm wavelength region. The use of high doping levels allows one to use relatively short fibers and reduce the possibility of unwanted nonlinear effects in the fiber, such as stimulated Brillouin scattering, a special concern for sources designed to excite sodium atomic resonance fluorescence. In some embodiments, the same Al-doping approach used for Tm:silica fibers can be employed to make Yb:silica fibers. High Yb doping can be associated with the tendency of fibers to develop photodarkening, but the rate of darkening is proportional to the $7^{th}$ power of the inversion fraction. The effect can be significant in Yb:fiber lasers operating with inversion fractions in the 10% and higher range. In some embodiments, the invention contemplates a fiber laser operating with a 0.7% inversion fraction.

In summary, through the use of the long-wavelength pump source and highly doped fiber various examples illustrate the ability to allow construction of practical, high-gain amplifiers and oscillators at much longer wavelengths than the gain peak, and overcome the limits to gain set by ASE and other spurious effects.

The terminology used herein is for the purpose of describing particular embodiments and is not intended to be limiting of the inventive concepts. It will be understood that, although the terms first, second, third etc. are used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present application.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A method of operating a Tm:doped fiber amplifier, the method comprising:
    selecting a length of Tm:doped optical fiber to be less than one hundred meters;
    doping the optical fiber with active ions at a doping level of greater than one percent;
    optically pumping the doped optical fiber with a first laser beam having a wavelength longer than the wavelength where a maximum absorption cross section is provided by the active ions; and
    creating a population inversion between two active ion energy levels with the first laser beam, the active ions providing a gain to a second laser beam.

2. The method of claim 1 further comprising selecting a length of the Tm:doped optical fiber to be less than fifty meters.

3. The method of claim 1 further comprising doping the optical fiber with active ions at a doping level of greater than 4.5 percent.

4. The method of claim 1 further comprising doping the optical fiber with active ions at a doping level of greater than 7 percent.

5. The method of claim 1 wherein the first laser beam has a wavelength equal to or longer than 1930 nm.

6. The method of claim 1 wherein the second laser beam has a wavelength equal to or longer than 2000 nm.

7. A method of operating a Yb:doped fiber amplifier, the method comprising:
    selecting a length of Yb:doped optical fiber to be less than one hundred meters;
    doping the optical fiber with active ions at a doping level of greater than one percent;
    optically pumping the doped optical fiber with a first laser beam having a wavelength longer than the wavelength where a maximum absorption cross section is provided by the active ions; and
    creating a population inversion between two active ion energy levels with the first laser beam, the active ions providing a gain to a second laser beam.

8. The method of claim 7 further comprising selecting a length of the Yb:doped optical fiber to be less than fifty meters.

9. The method of claim 7 further comprising doping the optical fiber with active ions at a doping level of greater than 4.5 percent.

10. The method of claim 7 further comprising doping the optical fiber with active ions at a doping level of greater than 7 percent.

11. The method of claim 7 wherein the first laser beam has a wavelength equal to or longer than 1050 nm.

12. The method of claim 7 wherein the second laser beam has a wavelength equal to or longer than 1100 nm.

13. A method of operating a fiber laser, the method comprising:
    selecting a length of silica optical fiber to be less than one hundred meters;
    doping the optical fiber with active ions at a doping level of greater than one percent;
    optically pumping the doped optical fiber with a first laser beam having a wavelength such that an absorption cross section provided by the active ions is less than ten percent of a maximum absorption cross section provided by the active ions;
    creating a population inversion between two active ion energy levels with the first laser beam, the active ions providing a gain to a second laser beam;
    amplifying the second laser beam having a wavelength where a gain provided by the active ions is less than fifty percent of a peak gain provided by the active ions.

14. The method of claim 13 further comprising doping the optical fiber with active ions at a doping level of greater than 4.5 percent.

15. The method of claim 14 further comprising doping the optical fiber with active ions at a doping level of greater than 7 percent.

16. The method of claim 15 wherein the doped optical fiber is a Tm:doped optical fiber.

17. The method of claim 16 wherein the first laser beam has a wavelength equal to or longer than 1930 nm.

18. The method of claim 17 wherein the second laser beam has a wavelength equal to or longer than 2000 nm.

19. The method of claim 18 further comprising selecting a length of the Tm:doped optical fiber to be less than fifty meters.

* * * * *